(12) United States Patent
Pike

(10) Patent No.: US 6,624,100 B1
(45) Date of Patent: *Sep. 23, 2003

(54) MICROFIBER NONWOVEN WEB LAMINATES

(75) Inventor: Richard Daniel Pike, Norcross, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 260 days.

This patent is subject to a terminal disclaimer.

(21) Appl. No.: 09/610,339

(22) Filed: Jul. 3, 2000

Related U.S. Application Data (63) Continuation of application No. 09/256,377, filed on Feb. 24, 1999, now abandoned, which is a continuation of application No. 08/959,115, filed on Oct. 23, 1997, now Pat. No. 5,935,883, which is a continuation of application No. 08/565,466, filed on Nov. 30, 1995, now abandoned.

(51) Int. Cl.[7] .............................. D04H 5/00; D04H 1/00; D04H 13/00; D04H 3/00; B32B 5/26; B32B 5/06; D02G 3/00

(52) U.S. Cl. ..................... 442/340; 428/397; 442/341; 442/346; 442/351; 442/361; 442/362; 442/363; 442/382; 442/384; 442/389; 442/415

(58) Field of Search ................... 442/327, 340–341, 442/346, 351, 382, 384, 389, 400–401, 361, 362, 363, 415; 428/397

(56) References Cited

U.S. PATENT DOCUMENTS

| | | |
|---|---|---|
| 3,117,906 A | 1/1964 | Tanner |
| 3,323,978 A | 6/1967 | Rasmussen |
| 3,353,345 A | 11/1967 | Setzer |
| 3,382,305 A | 5/1968 | Breen |
| 3,388,547 A | 6/1968 | Koga et al. |
| 3,509,009 A | 4/1970 | Hartmann |
| 3,551,229 A | 12/1970 | Yazawa |
| 3,582,418 A | 6/1971 | Schurr |
| 3,589,956 A | 6/1971 | Kranz |

(List continued on next page.)

FOREIGN PATENT DOCUMENTS

| | | |
|---|---|---|
| CA | 730 055 | 3/1966 |
| DE | 74 637 | 7/1970 |
| DE | 2 231 523 | 1/1974 |
| DE | 2 355 140 | 5/1974 |
| DE | 3 605 165 | 8/1986 |
| EP | 0 090 397 | 10/1983 |
| EP | 0 351 318 | 1/1990 |
| EP | 0 380 358 | 8/1990 |

(List continued on next page.)

OTHER PUBLICATIONS

V.A. Wente, et al., *Manufacture of Superfine Organic Fibers*, Naval Research Laboratory, Washington, D.C. NRL Rpt 4364, 111437, May 25, 1954.

K.D. Lawrence, et al., *An Improved Device For The Formation Of Superfine Thermoplastic Fibers*, U.S. Naval Research Laboratory, Washington, D.C. , NRL Rpt 5265, Feb. 11, 1959.

Polymers: Chemistry And Physics of Modern Material, pp. 145–145; by JMG Cowie, Int'l Textbook Co., Ltd. 1973.

Primary Examiner—Elizabeth M. Cole
Assistant Examiner—Jeremy R. Pierce
(74) Attorney, Agent, or Firm—Ralph H. Dean, Jr.

(57) ABSTRACT

The present invention provides a web containing superfine microfibers. The web contains a blend of a first group of split microfibers which contains a first polymer component and a second group of split microfibers which contains a second polymer component, wherein at least one of the polymer components is hydrophilic. The invention additionally provides a meltblown fiber web having at least two groups of fibers, wherein each group of the fibers has a distinct cross-sectional configuration.

17 Claims, 5 Drawing Sheets

U.S. PATENT DOCUMENTS

| | | |
|---|---|---|
| 3,608,024 A | 9/1971 | Yazawa |
| 3,616,160 A | 10/1971 | Wincklhofer et al. |
| 3,620,892 A | 11/1971 | Wincklhofer et al. |
| 3,692,618 A | 9/1972 | Dorschner et al. |
| 3,802,817 A | 4/1974 | Matsuki et al. |
| 3,849,241 A | 11/1974 | Butin et al. |
| 3,853,977 A | 12/1974 | Matsui et al. |
| 3,876,459 A | 4/1975 | Burrill |
| 3,917,448 A | 11/1975 | Wood |
| 3,917,784 A | 11/1975 | Nishida |
| 3,978,185 A | 8/1976 | Buntin et al. |
| 4,038,452 A | 7/1977 | Kobayashi et al. |
| 4,041,203 A | 8/1977 | Brock et al. |
| 4,051,287 A | 9/1977 | Hayashi et al. |
| 4,102,969 A | 7/1978 | Neveu et al. |
| 4,118,534 A | 10/1978 | Stanley |
| 4,163,078 A | 7/1979 | Reinehr et al. |
| 4,239,720 A | 12/1980 | Gerlach et al. |
| 4,257,999 A | 3/1981 | Reinehr et al. |
| 4,288,484 A | 9/1981 | Norata et al. |
| 4,298,649 A | 11/1981 | Meitner |
| 4,340,563 A | 7/1982 | Appel et al. |
| 4,361,609 A | 11/1982 | Gerlach et al. |
| 4,369,156 A | 1/1983 | Mathes et al. |
| 4,381,274 A | 4/1983 | Kessler et al. |
| 4,381,335 A | 4/1983 | Okamoto |
| 4,391,872 A | 7/1983 | Suzuki et al. |
| 4,436,780 A | 3/1984 | Hotchkiss et al. |
| 4,447,489 A | 5/1984 | Linhart et al. |
| 4,460,649 A | 7/1984 | Park et al. |
| 4,496,619 A | 1/1985 | Okamoto |
| 4,497,868 A | 2/1985 | Reinehr et al. |
| 4,536,440 A | 8/1985 | Berg |
| 4,547,420 A | 10/1985 | Krueger et al. |
| 4,557,972 A | 12/1985 | Okamoto et al. |
| 4,568,506 A | 2/1986 | Kiriyama et al. |
| 4,714,647 A | 12/1987 | Shipp, Jr. et al. |
| 4,724,184 A | 2/1988 | Killian |
| 4,753,843 A | 6/1988 | Cook et al. |
| 4,767,825 A | 8/1988 | Pazos et al. |
| 4,795,668 A | 1/1989 | Krueger et al. |
| 4,810,449 A | 3/1989 | Reinehr et al. |
| 4,814,131 A | 3/1989 | Atlas |
| 4,824,451 A | 4/1989 | Vogt et al. |
| 4,830,904 A | 5/1989 | Gessner et al. |
| 4,923,454 A | 5/1990 | Seymour et al. |
| 4,966,808 A | 10/1990 | Kawano |
| 5,028,369 A | 7/1991 | Reinehr et al. |
| 5,032,442 A | 7/1991 | Yamazaki et al. |
| 5,033,172 A | 7/1991 | Harrington |
| 5,045,387 A | 9/1991 | Schmalz |
| 5,047,189 A | 9/1991 | Lin |
| 5,059,482 A | 10/1991 | Kawamoto et al. |
| 5,071,705 A | 12/1991 | Tanaka et al. |
| 5,075,161 A | 12/1991 | Nyssen et al. |
| 5,108,827 A | 4/1992 | Gessner |
| 5,120,888 A | 6/1992 | Nohr et al. |
| 5,143,786 A | 9/1992 | Tanaka et al. |
| 5,176,952 A | 1/1993 | Joseph et al. |
| 5,188,895 A | 2/1993 | Nishino et al. |
| 5,200,246 A | 4/1993 | Sabee |
| 5,219,633 A | 6/1993 | Sabee |
| 5,229,191 A | 7/1993 | Austin |
| 5,238,733 A | 8/1993 | Joseph et al. |
| 5,257,982 A | 11/1993 | Cohen et al. |
| 5,258,220 A | 11/1993 | Austin |
| 5,275,884 A | 1/1994 | Nishino et al. |
| 5,288,348 A | 2/1994 | Modrak |
| 5,288,553 A | 2/1994 | Collins et al. |
| 5,290,626 A | 3/1994 | Nishino et al. |
| 5,306,545 A | 4/1994 | Shirayanagi et al. |
| 5,310,514 A | 5/1994 | Ruzek et al. |
| 5,336,552 A | 8/1994 | Strack et al. |
| 5,369,858 A | 12/1994 | Gilmore et al. |
| 5,372,885 A | 12/1994 | Tabor et al. |
| 5,382,400 A | 1/1995 | Pike et al. |
| 5,418,045 A | 5/1995 | Pike et al. |
| 5,439,734 A | 8/1995 | Everhart et al. |
| 5,484,645 A | 1/1996 | Lickfield et al. |
| 5,503,746 A | 4/1996 | Gagnon |
| 5,573,668 A | 11/1996 | Grosh et al. |
| 5,597,647 A | 1/1997 | Powers |
| 5,616,408 A * | 4/1997 | Oleszczuk et al. ........ 156/306.6 |
| 5,620,785 A | 4/1997 | Watt et al. |
| 5,718,972 A | 2/1998 | Murase et al. |
| 5,759,926 A | 6/1998 | Pike et al. |
| 5,783,503 A | 7/1998 | Gillespie et al. |
| 5,895,710 A * | 4/1999 | Sasse et al. ............... 264/171.1 |
| 5,935,883 A * | 8/1999 | Pike ........................... 442/340 |

FOREIGN PATENT DOCUMENTS

| | | |
|---|---|---|
| EP | 0 754 796 A1 | 1/1997 |
| GB | 1 074 088 | 6/1967 |
| GB | 1 217 892 | 12/1970 |
| GB | 1 218 191 | 1/1971 |
| GB | 1 260 836 | 1/1972 |
| GB | 1 260 837 | 1/1972 |
| GB | 1 364 430 | 8/1974 |
| GB | 1 540 941 | 2/1979 |
| GB | 2 065 732 | 7/1981 |
| JP | 49-132377 | 12/1974 |
| JP | 53-122875 | 10/1978 |
| JP | 78-042830 | 11/1978 |
| JP | 81-031380 | 7/1981 |
| JP | 60-045610 | 3/1985 |
| JP | 61-266616 | 11/1986 |
| JP | 62-041316 | 2/1987 |
| JP | 62-078213 | 4/1987 |
| JP | 62-170585 | 7/1987 |
| JP | 62-257459 | 11/1987 |
| JP | 63-006161 | 1/1988 |
| JP | 63-005495 | 2/1988 |
| JP | 63-105139 | 5/1988 |
| JP | 01-162813 | 6/1989 |
| JP | 01-162825 | 6/1989 |
| JP | 01-168919 | 7/1989 |
| JP | 89-054052 | 11/1989 |
| JP | 2084531 | 3/1990 |
| JP | 02-091210 | 3/1990 |
| JP | 02-091216 | 3/1990 |
| JP | 02-169722 | 6/1990 |
| JP | 02-182962 | 7/1990 |
| JP | 02-229270 | 9/1990 |
| JP | 02-251673 | 10/1990 |
| JP | 03-199425 A | 8/1991 |
| JP | 03-213554 | 9/1991 |
| JP | 03-220358 | 9/1991 |
| JP | 03-269153 | 11/1991 |
| JP | 03-294585 | 12/1991 |
| JP | 04-018124 | 1/1992 |
| JP | 04-126840 | 4/1992 |
| JP | 04-202895 | 7/1992 |
| JP | 04-263679 | 9/1992 |
| JP | 41-33849 | 11/1992 |
| JP | 04-361618 | 12/1992 |
| JP | 05-25762 | 2/1993 |
| JP | 50-25772 | 2/1993 |
| JP | 05-51818 | 3/1993 |
| JP | 05-106160 | 4/1993 |
| JP | 05-106161 | 4/1993 |
| JP | 05-106162 | 4/1993 |

| | | | | | |
|---|---|---|---|---|---|
| JP | 05-163664 | 6/1993 | WO | 95/03172 | 2/1995 |
| JP | 05-186946 | 7/1993 | WO | 96/41041 | 12/1996 |
| JP | 05-230777 | 9/1993 | WO | 98/03710 | 1/1998 |
| JP | 05-239740 | 9/1993 | WO | 98/09010 | 3/1998 |
| JP | 62-093117 | 10/1994 | | | |
| JP | 07-003595 | 1/1995 | | | |
| RU | 1 513 043 | 10/1989 | * cited by examiner | | |

MICROFIBER NONWOVEN WEB LAMINATES

This application is a continuation of application Ser. No. 09/256,377 filed Feb. 24, 1999 (now abandoned), which is a continuation of application Ser. No. 08/959,115 filed Oct. 23, 1997 (now U.S. Pat. No. 5,935,883), which is a continuation of application Ser. No. 08/565,466 filed Nov. 30, 1995 (now abandoned). The entirety of the aforesaid applications are hereby incorporated by reference.

BACKGROUND OF THE INVENTION

The present invention is related to a microfiber nonwoven web. More specifically, the invention is related to a web containing superfine microfibers.

Microfiber webs, such as meltblown fiber webs, are well known, and meltblown fiber webs are described in various patents and publications, including Naval Research Laboratory Report 4364, "Manufacture of Super-Fine Organic Fibers" by V. A. Wendt et al.; Naval Research Laboratory Report 5265, "An improved Device for the Formation of Super-Fine Organic fibers" by K. D. Lawrence et al.; and U.S. Pat. No. 3,849,241 to Butin et al. Meltblown fiber webs, which contain thermoplastic microfibers generally having less than 10 μm in average diameter, are produced by heating a polymer resin to form a melt, extruding the melt through die orifices in a die head to form filaments, directing a stream of heated fluid, usually air, toward the filaments exiting the die orifice to attenuated the filaments, and collecting the filaments on a foraminous surface to form a nonwoven web. Because the filaments are still tacky when they are collected, they form autogenous interfiber bonds to produce an integrated web.

Although conventional meltblown fiber webs contain fine microfibers, there is a need for fiber webs containing finer microfibers. There have been various attempts to reduce the diameter of meltblown fibers. One example of such attempts is reducing the polymer through-put to the die head. However, this direct controlling approach for producing fine meltblown fibers can only be used to reduce the fiber size to a limited extent since after a certain limit the reduction in through-put interrupts the fiber production altogether. Another exemplary process for producing fine meltblown fibers involves the steps of producing bicomponent conjugate meltblown fibers of an island-in-sea configuration and then dissolving the sea component of the meltblown fibers, thereby producing microfibers of the island component. However, the dissolving process is disadvantageous in that it requires a cumbersome dissolving step and it removes substantial portions of the conjugate fibers to produce fine fibers. Consequently, the dissolving process tends to be uneconomical and inefficiently utilizes the component polymers.

Yet another group of exemplary processes known in the art for producing fine fibers is split fiber production processes. However, known split fiber production processes may not be suitable for splitting meltblown fibers. The most widely used split fiber production process is a hydroneedling process, which utilizes a pressurized stream of water to split multicomponent conjugate fibers. In general, the process simultaneously splits and entangles the fibers to form a bonded nonwoven web. However, the hydroneedling process has not been used to produce split meltblown fiber webs since the autogenously bonded meltblown fiber webs, which have very fine breakable fibers and contain substantially uniformly distributed numerous interfiber bonds that restrict fiber movements, are difficult to split with the mechanical splitting process.

There are other fine microfiber webs known in the art, and they include glass microfiber webs. Although superfine glass microfibers can be produced, the glass microfibers are brittle and, thus, are not suitable for applications in which strength properties of the fibers are important.

There remains a need for superfine microfiber webs and a production process for producing the webs.

SUMMARY OF THE INVENTION

The present invention provides a web containing superfine microfibers. The web contains a blend of a first group of split microfibers which contains a first polymer component and a second group of split microfibers which contains a second polymer component, wherein at least one of the polymer components is hydrophilic. The invention additionally provides a meltblown fiber web having at least two groups of fibers, wherein each group of the fibers has a distinct cross-sectional configuration.

The invention also provides a splittable meltblown conjugate fiber containing at least two incompatible polymer components that are arranged in distinct segments across the cross-section of the fiber along the fiber length. The fiber can be characterized in that at least one of the polymer components is hydrophilic. In addition, at least one of the component polymers forms distinct unocclusive cross-sectional segments along the length of the fiber such that the segments are dissociable.

The superfine split microfiber web of the present invention exhibits, over conventional meltblown fiber webs, improved properties including improved fiber coverage, strength and textural properties, barrier properties, filtration properties and the like.

The term "steam" as used herein refers to both steam and a mixture of steam and air, unless otherwise indicated. The term "aqueous medium" as used herein indicates a liquid or gaseous medium that contains water or steam. The term "fibers" as used herein refers to both staple length fibers and continuous filaments, unless otherwise indicated. The term "multicomponent conjugate fiber" as used herein refers to a fiber which contains at least two component polymers that are arranged to occupy distinct segments of the cross-section of the fiber along the fiber length.

DETAILED DESCRIPTION OF THE INVENTION

The present invention provides a superfine microfiber web, and the superfine microfibers of the web are produced by splitting splittable conjugate meltblown fibers. The superfine split microfiber web contains at least two groups of fibers, and the polymers forming the two fiber groups are incompatible. In addition, at least one of the incompatible component polymers is hydrophilic. The term "hydrophilic" as used herein indicates affinity for water. The hydrophilicity of the hydrophilic component polymer can be measured in accordance with the ASTM D724-89 contact angle testing procedure on a film produced by melt casting the polymer at the temperature of the die head that is used to produce the split microfiber web. Desirably, the hydrophilic polymer has an initial contact angle equal to or less than about 80°, more desirably equal to or less than about 75°, even more desirably equal to or less than about 60°, most desirably equal to or less than about 50°. The term "initial contact angle" as used herein indicates a contact angle measurement made within about 5 seconds of the application of water drops on a test film specimen. In accordance with the present invention, the hydrophilic polymer component can be a naturally hydrophilic polymer or a hydrophilically modified polymer.

The splittable conjugate meltblown fiber of the present invention spontaneously splits without extraneous mechanical agitation or fibrillation when the fiber is contacted with a hot aqueous split-inducing medium. Aqueous split-inducing media suitable for the invention include hot water, desirably hot water having a temperature of at least about 60° C., more desirably a temperature between about 65° C. and 100° C. Additionally suitable split-inducing media are steam and mixtures of steam and air that have a temperature higher than 60° C. but lower than the melting point of the lowest melting polymer of the conjugate fiber in order to prevent inadvertent melting of the polymer component during the fiber splitting process. Desirably, the air-steam mixture has between about 0% and about 75% of air and between about 100% and about 20% of steam. When an air-steam mixture medium is utilized, the temperature of the air, which is mixed with steam, can be adjusted to change the temperature of the split-inducing medium. For example, the temperature of the air can be elevated to further increase the temperature of the steam-air mixture.

In accordance with the invention, the conjugate microfibers split in a time frame equal to or less than about 30 seconds; desirably equal to or less than about 10 seconds; more desirably equal to or less than 5 seconds; most desirably less than equal to or less than 1 seconds, e.g., nearly instantaneous, when contacted with the split-inducing medium. In addition, at least about 25%, desirably at least about 50%, more desirably at least about 75%, most desirably at least about 95% and up to 100% of the conjugate meltblown fiber splits with the present fiber splitting process.

The superfine split microfiber production process is highly advantageous over prior art fine microfiber production processes. Unlike the prior art dissolving production processes, the present split microfiber production process is simple and spontaneous and does not create significant amounts of byproducts that may need to be disposed of. In addition, the present splitting process does not remove portions of the fibers. Consequently, the splitting process does not reduce the weight and fiber coverage of the fiber web. In fact, the present splitting process, which increases the number of fiber strands in the nonwoven web without reducing its basis weight, improves the fiber coverage and textural and physical properties of the web. Furthermore, the superfine microfiber webs produced from the present process provide highly desirable properties including strength properties and drapability over glass fiber webs containing comparably sized superfine glass microfibers.

As stated above, the superfine split microfiber webs of the invention are produced from multicomponent conjugate meltblown fibers having at least two incompatible polymers that are placed to occupy distinct segments across the cross-section along the entire or substantially entire length of each fiber. In accordance with the present invention, each segment of the conjugate fiber is occupied by a polymer that is incompatible with the polymer or polymers of the adjacent segment or segments. For example, two incompatible polymer compositions are alternatingly placed to form a unitary conjugate fiber or a number of mutually incompatible polymers are placed to form the conjugate fiber.

The conjugate fiber should have a cross-sectional configuration that is amenable to partial or complete dissociation. Accordingly, at least one dissociable segment of the cross-section of the conjugate fiber, which is occupied by one of the component polymers of the fiber, forms a portion of the peripheral surface of the fiber and has a configuration that is not occluded by the adjacent segments such that the dissociable segment is not physically impeded from being separated.

Figure 1:
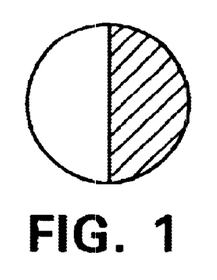
FIGS. 1–4 illustrate suitable conjugate fiber configurations for the present invention.
Figure 2:
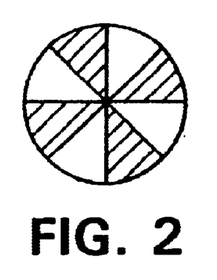
Figure 3:
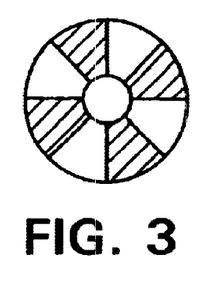
Figure 4:
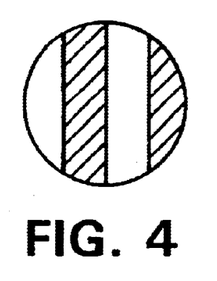
Figure 5:
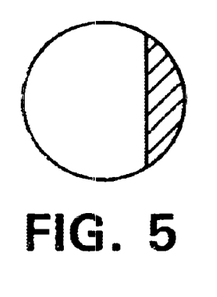
FIGS. 5–6 illustrate exemplary asymmetrical conjugate fiber configurations for the present invention.
Figure 6:
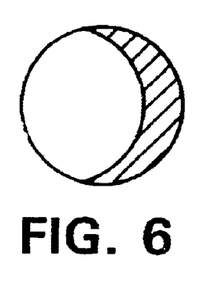

Suitable configurations for the conjugate fibers include side-by-side configurations (FIG. 1), wedge configurations (FIG. 2), hollow wedge configurations is (FIG. 3) and sectional configurations (FIG. 4). It is to be noted that a suitable configuration does not need to have a symmetrical geometry provided that it is not occlusive or interlocking. Accordingly, suitable configurations also include asymmetrical configurations, for example, shown in FIGS. 5–6. Splittable conjugate fibers having an asymmetrical cross-sectional configuration, for example, FIG. 5 or FIG. 6, form a superfine microfiber web containing a mixture of at least two groups of fibers having different cross-sectional configurations, sizes or shapes. In addition, the splittable conjugate fibers need not be conventional round fibers. Other useful fiber shapes include rectangular, oval and multilobal shapes.

The different component polymers of the conjugate fiber need not be present in equal amounts. For example, a component polymer of the conjugate fiber may form a thin film-like section that merely acts as a divider between two adjacent component polymers, thus, providing a web that contains fine microfibers of mainly one polymer component.

Additionally, the splittable conjugate microfibers may be crimped or uncrimped. Crimped splittable microfibers of the present invention are highly useful for producing a lofty web since crimps increase the bulk or loft of the web.

In accordance with the invention, split microfibers having various thicknesses can be conveniently produced by adjusting the thickness of the conjugate fibers and/or adjusting the number of segments within the cross-section of the conjugate fibers. In general, a conjugate fiber having a finer thickness and/or a higher number of cross-sectional segments results in finer split microfibers. Correspondingly, the thickness of the split microfibers can be easily adjusted to have a wide variety of thicknesses. Of the suitable thickness controlling methods, the method of adjusting the number of cross-sectional segments is particularly desirable for the present invention. By adjusting the number of cross-sectional segments and the thickness of the conjugate microfibers, the split microfibers of the invention can even be produced to have a weight-per-unit-length of about 0.2 µm or less.

As indicated above, hydrophilic polymers suitable for the present splittable conjugate fiber include both hydrophilic and hydrophilically modified polymers. Suitable hydrophilic polymers desirably have a contact angle less than equal to about 80°. Inherently hydrophilic polymers suitable for the present invention include thermoplastic polymers having the above-described hydrophilicity. Such polymers include copolymers of caprolactam and alkylene oxide diamine, e.g., Hydrofil®, which are commercially available from Allied-Signal Inc.; copolymers of poly(oxyethylene) and polyurethane, polyamide, polyester or polyurea, e.g., absorbent thermoplastic polymers disclosed in U.S. Pat. No. 4,767,825 to Pazos et al.; ethylene vinyl alcohol copolymers; and the like. U.S. Pat. No. 4,767,825 in its entirety is herein incorporated by reference.

Hydrophilically modifiable polymers suitable for the present invention include polyolefins, polyesters, polyamides, polycarbonates and copolymers and blends thereof. Suitable polyolefins include polyethylene, e.g., high density polyethylene, medium density polyethylene, low density polyethylene and linear low density polyethylene; polypropylene, e.g., isotactic polypropylene, syndiotactic polypropylene, blends of isotactic polypropylene and atactic polypropylene, and blends thereof; polybutylene, e.g., poly (1-butene) and poly (2-butene); polypentene, e.g., poly(1-pentene) and poly(2-pentene); poly(3-methyl-1-pentene); poly(4-methyl-1-pentene); and copolymers and blends thereof. Suitable copolymers include random and block copolymers prepared from two or more different unsaturated olefin monomers, such as ethylene/propylene and ethylene/butylene copolymers. Suitable polyamides include nylon 6, nylon 6/6, nylon 4/6, nylon 11, nylon 12, nylon 6/10, nylon 6/12, nylon 12/12, copolymers of caprolactam and alkylene oxide diamine, and the like, as well as blends and copolymers thereof. Suitable polyesters include polyethylene terephthalate, polybutylene terephthalate, polytetramethylene terephthalate, polycyclohexylene-1,4-dimethylene terephthalate, and isophthalate copolymers thereof, as well as blends thereof.

In accordance with the present invention, when a hydrophobic or less than sufficiently hydrophilic polymer is used as the hydrophilic component of the splittable conjugate fiber, the polymer must be hydrophilically or wettably modified. One useful means for modifying the polymer composition is adding a hydrophilic modifying agent or hydrophilic modifier. Suitable hydrophilic modifiers include various surfactants. Depending on the final use of materials containing the split microfibers, the surfactants can be fugitive or nonfugitive. Fugitive surfactants, i.e., surfactants that wash off from the fiber surface, are suitable if the split fibers are used in single exposure applications or applications in which nonwettable or hydrophobic properties are desired. When a fugitive surfatant is utilized, the split microfiber web can be subsequently washed such that the web and the split microfibers of the web become hydrophobic. Nonfugitive surfactants, i.e., surfactants that permanently or semipermanently adhere to the fiber surface, are suitable if the split fibers are used in applications in which more durably wettable or hydrophilic properties are desired. In addition, particularly suitable internally added surfactants are selected to have a low compatibility with the polymer of the hydrophilic component of the fiber since such surfactants readily migrate to the surface of the fiber during the fiber spinning process. When a surfactant having a slow migration characteristic is utilized, the fibers may need to be heat treated or annealed to facilitate the migration of the surfactant to the surface. Such heat treatment is known in the art as a "blooming" process. Illustrative examples of suitable surfactants include silicon based surfactants, e.g., polyalkylene-oxide modified polydimethyl siloxane; fluoroaliphatic surfactants, e.g., perfluoroalkyl polyalkylene oxides; and other surfactants, e.g., actyl-phenoxypolyethyoxy ethanol nonionic surfactants, alkylaryl polyether alcohols, and polyethylene oxides. Commercially available surfactants suitable for the present invention include various poly(ethylene oxide) based surfactants available under the tradename Triton, e.g., grade X-102, from Rohm and Haas Crop; various polyethylene glycol based surfactants available under the tradename Emerest, e.g., grades 2620 and 2650, from Emery Industries; various polyalkylene oxide modified polydimethylsiloxane based surfactants available under the tradename Masil, e.g., SF-19, which is available from Mazer; polyalkylene oxide fatty acid derivatives available under the tradename PEG, e.g. PEG 400, which is available from ICI; sorbitan monooleate, e.g., Span 80, which is available from ICI; ethoxylated hydroxylated castor oil, e.g., G1292, which is available from ICI; a mixture of sorbitan monooleate and ethoxylated hydroxylated castor oil, e.g., Ahcovel Base N62, which is available from ICI; polyoxyalkylene modified fluoroaliphatic surfactants which are available, e.g., from Minnesota Mining and Manufacturing Co.; and mixtures thereof.

The amount of surfactants required and the hydrophilicity of modified fibers for each application will vary depending on the type of surfactant and the type of polymer used. In general, fibers containing more hydrophilic or hydrophilically modified polymer or polymers result in more spontaneous splitting. Consequently, a high level of surfactant can be added to the polymer composition of the conjugate fibers provided that the surfactant level is not too high as to adversely affect the processability of the polymer composition. Typically, the amount of the surfactant suitable for the present fiber composition is in the range of from about 0.1% to about 5%, desirably from about 0.3% to about 4.5%, more desirably from about 0.5% to about 4%, by weight based on the weight of the polymer composition. The surfactant is thoroughly blended with the polymer composition before the composition is processed into fibers. For example, when a melt-extrusion process for producing fibers is utilized, the surfactant is blended and melt-extruded with the polymer compositions in extruders and then spun into fibers.

In accordance with the present invention, additional component polymers for the splittable conjugate fibers are selected from hydrophilic and hydrophobic thermoplastic polymers. Suitable polymers include the above-illustrated hydrophilic polymers and hydrophilically modifiable polymers. The additional component polymers do not have to hydrophilic, but need to be incompatible with the hydrophilic component polymer of the meltblown conjugate fibers.

The term "incompatible polymers" as used herein indicates the polymers that do not form a miscible blend when melt blended, i.e., immiscible. As a desirable embodiment of the present invention, differences in the polymer solubility parameter ($\delta$) are used to select suitably incompatible polymers. The polymer solubility parameters ($\delta$) of different polymers are well known in the art. A discussion of the solubility parameter is, for example, disclosed in *Polymer: Chemistry and Physics of Modern Materials*, pages 142–145, by JMG Cowie, International Textbook Co., Ltd., 1973. Desirably, the adjacently disposed component polymers of the present meltblown conjugate fiber have a difference in the solubility parameter of at least about 0.5 $(cal/cm^3)^{1/2}$, more desirably at least about 1 $(cal/cm^3)^{1/2}$, most desirably at least about 2 $(cal/cm^3)^{1/2}$. The upper limit of the solubility parameter difference is not critical for the present invention since the higher the difference, the more spontaneous the splitting of the fiber becomes.

Illustrative examples of particularly desirable pairs of incompatible polymers useful for the present conjugate microfibers include polyolefin-polyamide, e.g., polyethylene-nylon 6, polyethylene-nylon 6/6, polypropylene-nylon 6, polypropylene-nylon 6/6, polyethylene-a copolymer of caprolactam and alkylene oxide diamine, and polypropylene-a copolymer of caprolactam and alkylene oxide diamine; polyolefin-polyester, e.g., polyethylene-polyethylene terephthalate, polypropylene-polyethylene terephthalate, polyethylene-polybutylene terephthalate and polypropylene-polybutylene terephthalate; and polyamide-polyester, e.g., nylon 6-polyethylene terephthalate, nylon 6/6-polyethylene terephthalate, nylon 6-polybutylene terephthalate, nylon 6/6-polybutylene terephthalate, polyethylene terephthalate-a copolymer of caprolactam and alkylene oxide diamine, and polybutylene terephthalate-a copolymer of caprolactam and alkylene oxide diamine and polypropylene.

Figure 7:
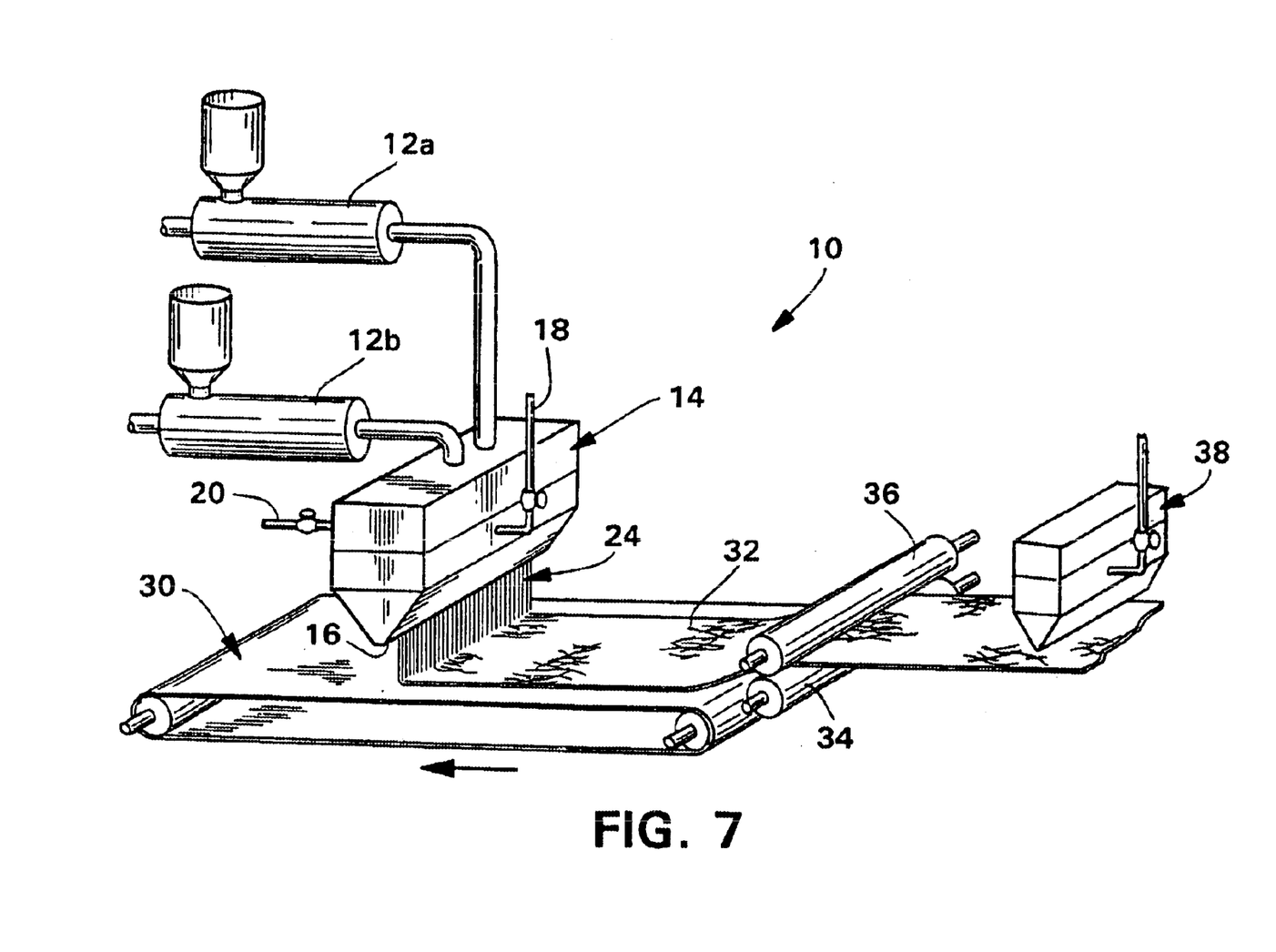
FIG. 7 illustrates an exemplary superfine split microfiber web production process for the invention.
Figure 8:
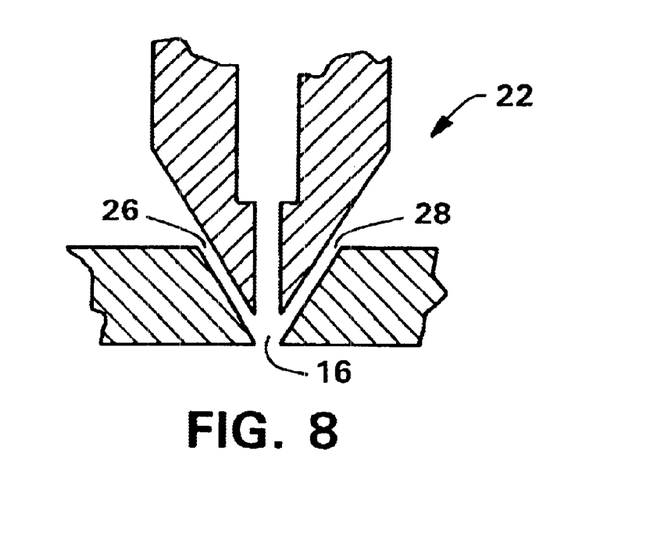
FIG. 8 illustrates an exemplary die head for producing meltblown fibers.

FIG. 7 illustrates an exemplary process for producing a superfine split microfiber nonwoven web of the present invention. A process line 10 is arranged to produce a split meltblown fiber nonwoven web of two polymer components (bicomponent). It is to be noted that conjugate meltblown fibers containing more than two polymer components can be produced. The process line 10 includes a pair of extruders 12a and 12b for separately melt-processing two incompatible component polymers. One or both of the component polymers are hydrophilic polymers or hydrophobic polymers blended with effective amounts of a hydrophilic modifier in accordance with the present invention, and they are fed into respective extruders. Alternatively, the hydrophilic modifier can be injected into the respective extruders. The polymers are melt-processed in the extruders and then fed to, for example, a side-by-side die head 14. Generally described, the die head 14 includes a housing containing a plurality of plates stacked one on top of the other with a pattern of openings arranged to create flow paths for directing polymer extrudates through the die 14 into die tip openings or orifices 16. The die head tip 22 which is shown in cross-section in FIG. 8, contains die openings 16. Each of the openings 16 receives predetermined amounts of the two extrudates in a side-by-side configuration, forming a side-by-side filament 24. Hot high-pressure fluid, usually air, is supplied to the die tip via pipes 18 and 20 which terminate in channels 26 and 28 adjacent the die openings 16. As the extrudates exit the die openings 16 to form filaments 24, the high-pressure fluid attenuates and carries the filaments 24 onto a moving foraminous belt 30. Alternatively, the high-pressure fluid can be used to attenuate filaments and to break up the filaments to form air-borne fine discontinuous fibers. The attenuated filaments or fibers 24, which are not fully quenched and still tacky, are randomly deposited to form an autogenously bonded nonwoven web 32. A vacuum is drawn underneath the foraminous belt 30 to assist the web formation. Once the fibers are deposited and the web is formed, the web 32 is drawn from the belt 30 by rolls 34 and 36. The conjugate meltblown fiber web 32 is then passed under a spray apparatus 38 that thoroughly and evenly applies a hot aqueous split-inducing medium, e.g., steam or hot water, to split the fibers of the web. As an alternative embodiment, the web 32 can be passed though a hot water bath. A vacuum apparatus (not shown) can be placed on the other side of the web under the spray apparatus 38 to remove the applied split-inducing medium. The spilt fiber web is then dried.

The superfine split meltblown fiber web exhibits desirable properties, such as uniformity of the fabric, uniform fiber coverage, high barrier properties, high filtration properties and high fiber surface area. Webs containing the split microfibers that exhibit the above-illustrated desirable properties are highly suitable for various uses. For example, nonwoven webs containing the split microfibers are highly suitable for various uses including disposable articles, e.g., protective garments, sterilization wraps, wiper cloth and covers for absorbent articles.

As another embodiment of the present invention, the superfine microfiber web may be used as a laminate that contains at least one layer of the split microfiber web and at least one additional layer of another woven or nonwoven fabric or a film. The additional layer for the laminate is selected to impart additional and/or complementary properties, such as textural and strength properties. The layers of the laminate can be bonded to form a unitary structure by a bonding process known in the art to be suitable for laminate structures, such as a thermal, ultrasonic, adhesive, or hydroentangling process.

A laminate structure highly suitable for the present invention is disclosed in U.S. Pat. No. 4,041,203 to Brock et al., which is herein incorporated in its entirety by reference. In adapting the disclosure of U.S. Pat. No. 4,041,203, a pattern bonded laminate containing at least one layer of a continuous filament nonwoven web, e.g., spunbond fiber web, and at least one layer of the present superfine split microfiber nonwoven web can be produced, and such laminate combines the strength and textural properties of the spunbond web and the breathable barrier properties of the split microfiber web. The laminate structures are highly suitable for various uses including various skin-contacting applications, such as protective garments, covers for diapers, adult care products, training pants and sanitary napkins, various drapes, and the like.

Figure 11:
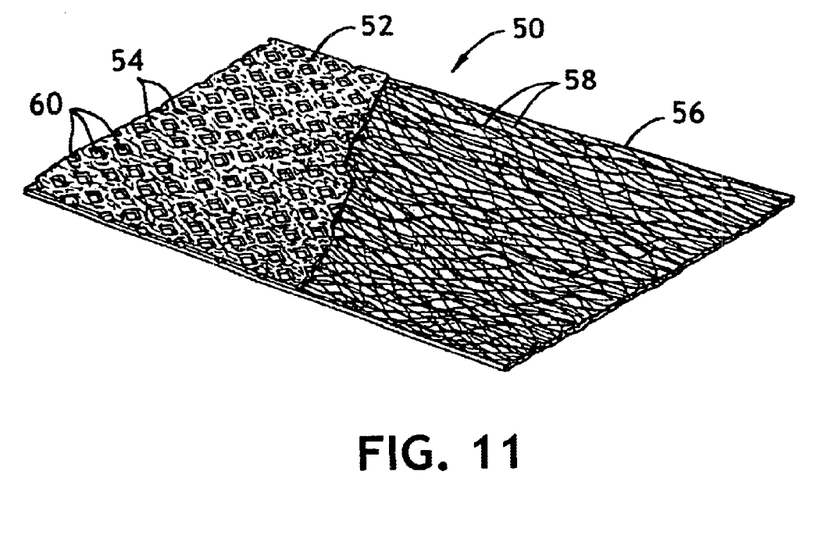
FIG. 11 illustrates a cut-away view of a two layer laminate of the present invention.

Turning now to the drawings, FIG. 11 depicts a nonwoven material 50 in the form of a laminate having as a top layer an integrated mat 52 of thermoplastic microfibers 54 and, as a bottom layer, a web 56 of substantially continuous and randomly deposited, molecularly oriented filaments 58 of a thermoplastic polymer. As illustrated, in order to provide a unitary structure, ply attachment between the mat and web can be effected at the intermittent discrete bond regions 60 which are disposed over the surface of the material in a substantially regular pattern. While it is preferred that the discrete bond regions 60 be formed by the application of heat and pressure at the illustrated intermittent areas, other methods of ply attachment such as the use of independently applied adhesives or mechanical interlocking of the fibers such as by needling techniques or the like can also be used.

Turning now to the web 56 of substantially continuous filaments, the manner of preparing this web is also customary with illustrative techniques being set forth in the following patents: Kinney (U.S. Pat. Nos. 3,338,992 and 3,341,394); Levy (U.S. Pat. No. 3,276,944): Peterson (U.S. Pat. No. 3,502,538); Hartmann (U.S. Pat. Nos. 3,502,763 and 3,509,009); Dobo et al. (U.S. Pat. No. 3,542,615); and Harmon (Canadian Patent No. 803,714).

While many different methods are illustrated for initially preparing such continuous filament webs, the available methods generally have at least three common features. First, the methods of preparation involve continuously extruding a thermoplastic polymer (either from the melt or a solution) through a spinneret in order to form discrete filaments. Thereafter, the filaments are drawn (either mechanically or pneumatically) without breaking in order to molecularly orient the polymer filaments and achieve tenacity. Lastly, the continuous filaments are deposited in a substantially random manner onto a carrier belt or the like to form a web of substantially continuous and randomly arranged, molecularly oriented filaments. A preferred method for preparing such webs is described in U.S. Pat. No. 3,692,618.

Figure 12:
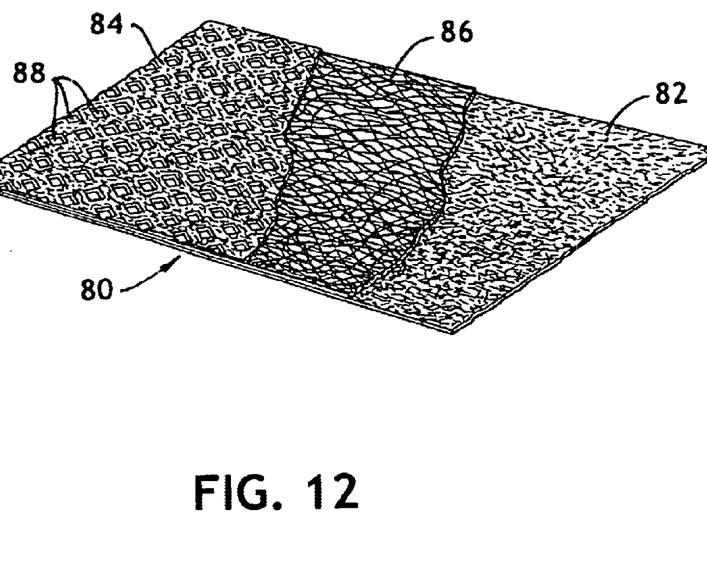
FIG. 12 illustrates a cut-away view of a three-layer laminate of the present invention.

Turning now, to FIG. 12, there is illustrated a further embodiment of the present invention wherein a material 80 is illustrated having, as outer plies, microfiber mats 82 and 84 and, as an inner ply a continuous filament web 86. Again, as illustrated in FIG. 11, ply attachment and integration of the continuous filament web is achieved by means of the regular pattern of intermittent bonds 88. Preparation of a material such as depicted in FIG. 12 can be accomplished by combining a second microfiber mat with a first microfiber mat and continuous filament web at the nip formed by a pair of rolls and thereafter passing the three ply composite through the rolls and bonding nip. Similarly, it will be understood that a microfiber mat can be formed on a wire and thereafter continuous filament webs can be disposed on one or both sides of the mat to form other constructions embodying the features of the present invention.

In addition to the illustrated desirable strength characteristics, the material possesses an overall opaque textile-like appearance, a desirable drape and full bodied hand, and is comfortable to the touch by appearing to equilibrate in moisture content with the surrounding atmosphere. In selecting the ratio of microfiber mat to continuous filament web, lower ratios are associated with uses where greater strength characteristics and less stringent barrier properties are required. As the microfiber mat content of the laminate is increased better barrier characteristics are noted but permeability is diminished. Preferred laminates are those wherein the mat to web ratio is less than about 1:1 (e.g., 7:1 to 0.9:1).

Laminates of the present invention are believed to be particularly useful as wipes for adding or removing water, polishes, and solvents and the like as well as for portable prewetted wash cloths for personal use. In addition, it has been found that certain laminates as herein described are exceptionally useful as sterile wrappers or containment fabrics for surgical and other health care procedures. As is well recognized, fabrics useful for these purposes must permit penetration of a sterilent (e.g. ethylene oxide, steam, gamma radiation, etc.), thereafter impede to a high degree passage of bacteria and like contaminants, be antistatic and preferably also fluid repellent. These applications include, among others, wraps for surgical instruments and packs, surgical caps, gowns and patient drapes, medical table covers, isolation gowns and scrub apparel.

Nonwoven materials are provided by the present invention which are fabric-like in drape, hand, and appearance. By employing the techniques illustrated herein, breathable, fluid repellent materials can be fashioned which are highly suitable for garment applications such as outwear lining, jackets, rainwear and the like. Furthermore, it has been found that those materials herein illustrated which have, as an exposed surface, a microfiber mat can be advantageously printed to provide decorative fabrics and, in addition, possess fluid retentive characteristics rendering them suitable as wipes as well as receptive to treatment with wetting agents and the like to impart absorbency characteristics.

Such uses may include: robe linings and facings; mattress pads, covers and ticking; shower curtains, drapes and drapery liners; pillow ticks, protectors and pillowcases; bedspreads and quilts; and, sleeping and slumber bags and liners. Similarly, with respect to the other strength characteristics, particularly grab tensile and trapezoid tear, a similar unexpected improvement in strength can be achieved which, as illustrated, is generally on the order of at least about 30% and generally at least about 50% compared with that theoretically predicted.

Yet another embodiment of the present innovation, the superfine split microfiber webs of the present invention is highly suitable for various filter media in that the webs have superfine fibers and uniform fiber coverage and provide highly desirable filtration properties. An example of microfiber filter media concept that can be adapted to use the present superfine microfiber webs is disclosed, for example, in U.S. Pat. No. 4,824,451 to Vogt et al., which patent is herein incorporated by reference.

The following examples are provided for illustration purposes and the invention is not limited thereto.

EXAMPLES

Testing Procedures

Frazier Permeability: The Frazier permeability, which expresses the permeability of a web in terms of cubic feet per minute of air per square foot of medium at a pressure drop of 0.5 inch of water, was determined utilizing a Frazier Air Permeability Tester available from the Frazier Precision Instrument Company and measured in accordance with Federal Test Method 5450, Standard No. 191A.

Contact Angle: The contact angle is an initial contact angle, i.e., measured within 5 seconds, that was measured on a 13 cm×13 cm cast film, which had a 3 mm thickness, with deionized water in accordance with ASTM D724-89.

Example 1 (Ex1)

A bicomponent meltblown fiber web was formed in accordance with the process described in U.S. Pat. No. 3,978,185 to Butin et al., except a side-by-side die head was used and two single screw extruders were used to process the two component polymers. The meltblown fibers of the web had 50 wt % of polypropylene and 50 wt % of nylon 6, based on the total weight of the fibers. The polypropylene was Himont's HH441, and the nylon 6 used was custom polymerized polycaprolactam, which was produced by Nyltech, Manchester, NH, and had a formic acid relative viscosity of 1.85. The solubility parameter difference of the two polymers is larger than 5 $(cal/cm^3)^{1/2}$. The nylon component additionally contained 2 wt % of ethyoxylated polysiloxane, SF-19, which is available from Mazer. The polymer components were fed into the extruders and were processed to 455° F. (235° C.) extrudates. The extrudates were fed into the die and processed into a meltblown bicomponent fiber web. The meltblown web was removed from the forming surface and placed in boiling water for 5 seconds. The treated web was then dried, and the web studied under a microscope. In addition, the modified nylon component composition was tested for its hydrophilicity and had a contact angle of about 40°.

The observation under the microscope indicated that a large portion of the fibers of the meltblown fiber web was split during the water treatment.

Comparative Example 1 (C1)

Comparative Example 1 is the meltblown bicomponent fiber web of Example 1 before the web was treated in boiling water. The nonwoven web did not contain apparently visible split fibers.

The visual observation of the webs of Example 1 and Comparative Example 1 demonstrates that the conjugate microfibers containing a hydrophilic component polymer split when treated with a split-inducing medium of the present invention.

Example 2 (Ex2)

A meltblown bicomponent fiber web was produced in accordance with Example 1 except the nylon component contained 4 wt % of the ethoxylated polysiloxane. The contact angle of the modified nylon component was about 10°. The treated nonwoven web was tested for its permeability, and the result is shown in Table 1.

Comparative Example 2 (C2)

Comparative Example 2 is the meltblown bicomponent fiber web of Example 2 before the web was treated in boiling water. The permeability result is shown in Table 1.

TABLE 1

| Example | Frazier Permeability |
|---------|---------------------|
| Ex2     | 240                 |
| C2      | 312                 |

The significant decrease in permeability of Example 2 clearly demonstrates that the hydrophilically modified conjugate microfibers split to form a web containing increased number of fiber strands when treated with a hot aqueous fibrillation-inducing medium, thereby improving the barrier property of the web.

Figure 9:
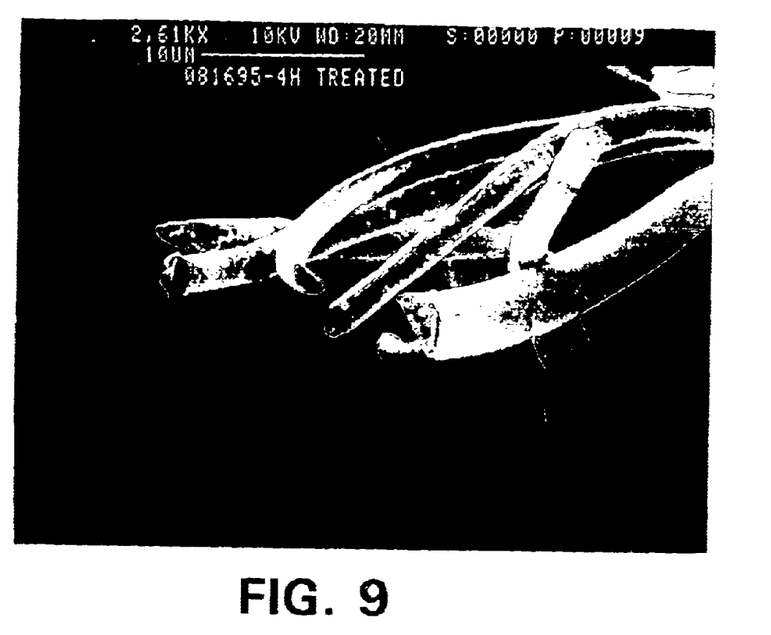
FIG. 9 is a microphotograph of a section of a split microfiber web of the present invention.
Figure 10:
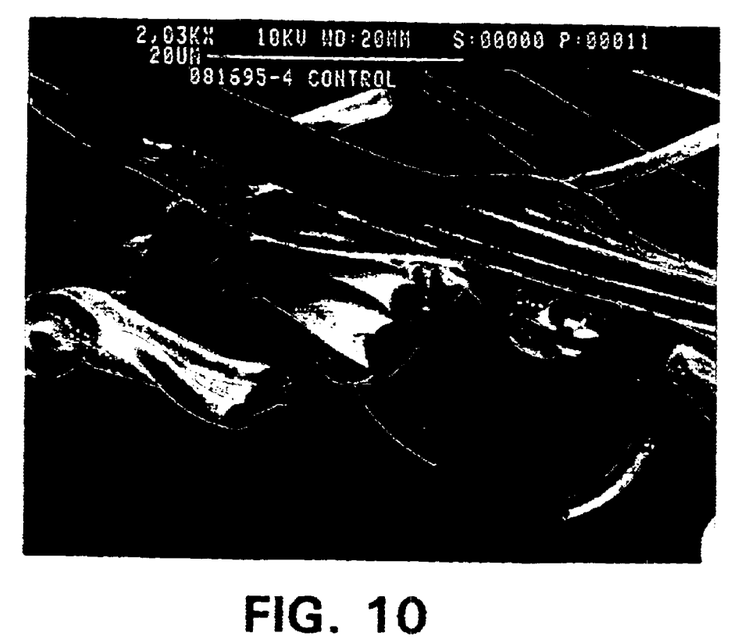
FIG. 10 is a microphotograph of a section of an untreated, unsplit microfiber web.

Turning to the figures, FIG. 9 is a scanning electron microphotograph of a representative section of the web of Example 2, and FIG. 10 is a scanning electron microphotograph of a representative section of the web of Comparative Example 2. FIG. 9 shows semicircular split fibers produced from round side-by-side meltblown fibers, whereas FIG. 10 shows unsplit bicomponent fibers of the web of Comparative Example 2.

As can be seen from the above examples, the present superfine split microfiber production process provides a spontaneously split superfine microfiber web. In addition, the superfine split microfiber web produced from the process provides a highly desirable combination of textural and physical properties, including desirable softness, uniform fiber coverage, desirable strength properties, drapability, high barrier properties, high filtration properties and the like.

What is claimed is:

1. A multilayer laminate comprising:
    a first layer, said first layer comprising a nonwoven web of continuous, molecularly oriented filaments; and
    a second layer fixedly attached to said first layer, said second layer comprising a nonwoven web of meltblown fibers wherein said meltblown fibers comprise a mixture of first meltblown fibers and second meltblown fibers, said first meltblown fibers comprising a first polymer and said second meltblown fibers comprising a second polymer and further wherein said first polymer is immiscible with said second polymer and the first meltblown fibers and the second meltblown fibers are split from common unitary fibers.

2. The multilayer laminate of claim 1 wherein the first and second layers are bonded by the process selected from the group consisting of thermal bonding, ultrasonic bonding, adhesively bonding and hydroentangling.

3. The multilayer laminate of claim 1 wherein said molecularly oriented filaments comprise spunbond fibers and wherein said multilayer laminate further comprises a third layer, said third layer comprising a nonwoven web of spunbond fibers and further wherein said second layer is positioned between said first and third layers.

4. The multilayer laminate of claim 3 wherein said layers are thermally bonded.

5. The multilayer laminate of claim 3 wherein said first and third layers comprise polyolefin fibers.

6. The multilayer laminate of claim 3 wherein said layers are adhesively bonded.

7. The multilayer laminate of claim 3 wherein said first and second polymers of said first and second meltblown fibers are selected from the group consisting of polyolefins, polyesters and polyamides.

8. A sterilization wrap comprising the multilayer laminate of claim 3.

9. A surgical gown comprising the multilayer laminate of claim 3.

10. A filter comprising the laminate of claim 3.

11. A wipe comprising the laminate of claim 3.

12. The wipe of claim 11 further containing a wetting agent.

13. The multilayer laminate of claim 1, made by the method comprising:
    forming a nonwoven web of continuous molecularly oriented filaments;
    forming a nonwoven web of multicomponent meltblown fibers, said multicomponent meltblown fibers comprising a first component of a first polymer and a second component of a second polymer and wherein said first and second polymers are immiscible with one another;
    fixedly attaching said nonwoven web of meltblown fibers to said nonwoven web of molecularly oriented filaments; and
    at least partially splitting said multicomponent meltblown fibers and separating said first and second components along a length-wise section of the multicomponent meltblown fibers.

14. The multilayer laminate of claim 13 wherein said continuous, molecularly oriented filaments comprise spunbond fibers.

15. The multilayer laminate of claim 14 wherein said nonwoven web of spunbond fibers are fixedly attached to said nonwoven web of multicomponent meltblown fibers by the method selected from the group consisting of thermal bonding, ultrasonic bonding, adhesive bonding and hydroentangling.

16. The multilayer laminate of claim 15 wherein said spunbond fiber web and said multicomponent meltblown fiber web are fixedly attached by thermal point bonding.

17. The multilayer laminate of claim 14 wherein said first nonwoven web of spunbond fibers and said multicomponent meltblown fibers are laminated to a second nonwoven web of spunbond fibers and wherein said multicomponent meltblown fibers are positioned between said first and second spunbond fiber webs.

* * * * *